United States Patent
Metge et al.

(10) Patent No.: US 12,158,185 B2
(45) Date of Patent: Dec. 3, 2024

(54) HOLLOW CONNECTING ROD

(71) Applicant: SAFRAN AIRCRAFT ENGINES, Paris (FR)

(72) Inventors: Pierre Jean-Baptiste Metge, Moissy Cramayel (FR); Tiphaine De Tinguy, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/245,327

(22) PCT Filed: Sep. 22, 2021

(86) PCT No.: PCT/FR2021/051623
§ 371 (c)(1),
(2) Date: Mar. 14, 2023

(87) PCT Pub. No.: WO2022/064138
PCT Pub. Date: Mar. 31, 2022

(65) Prior Publication Data
US 2023/0400053 A1    Dec. 14, 2023

(30) Foreign Application Priority Data
Sep. 23, 2020   (FR) ........................... 2009642

(51) Int. Cl.
*F16C 7/02*   (2006.01)
*B33Y 10/00*  (2015.01)
*B33Y 80/00*  (2015.01)

(52) U.S. Cl.
CPC ............... *F16C 7/02* (2013.01); *B33Y 10/00* (2014.12); *B33Y 80/00* (2014.12);
(Continued)

(58) Field of Classification Search
CPC .. F16C 7/02; F16C 7/023; F16C 7/026; F16C 7/08; F16C 2220/02; F16C 2220/24;
(Continued)

(56) References Cited

U.S. PATENT DOCUMENTS 6,349,615 B1 * 2/2002 Zimmer .................. B21B 39/04
                                          74/519
8,156,648 B2 * 4/2012 Audart-Noel ............. F16C 7/02
                                          29/888.09
(Continued)

FOREIGN PATENT DOCUMENTS

DE    23 00 670 A1    7/1974
DE    103 24 981 A1   2/2005
(Continued)

OTHER PUBLICATIONS

Machine translation of DE 10324981 A1 obtained on Mar. 8, 2024.*
(Continued)

*Primary Examiner* — Adam D Rogers
(74) *Attorney, Agent, or Firm* — Pillsbury Winthrop Shaw Pittman LLP

(57) ABSTRACT

A connecting rod includes a hollow body with a ring at each end and a centre, a thickness wall e, the wall defining an outer perimeter pe and an inner perimeter pi, a surface section s being contained between the outer and inner perimeters, wherein the outer perimeter pe increases from the ends of the hollow body to the centre of the connecting rod, the hollow body maintaining a constant surface section s, the thickness e decreasing from the end to the centre of the connecting rod.

10 Claims, 3 Drawing Sheets

(52) U.S. Cl.
CPC ...... *F16C 2220/02* (2013.01); *F16C 2220/24* (2013.01); *F16C 2220/60* (2013.01); *F16C 2326/43* (2013.01)

(58) Field of Classification Search
CPC ....... F16C 2220/60; B62D 7/20; B33Y 10/00; B33Y 80/00
See application file for complete search history.

(56) References Cited

U.S. PATENT DOCUMENTS

| | | | | |
|---|---|---|---|---|
| 9,393,850 | B2* | 7/2016 | Kuroda | B29C 45/0005 |
| 9,568,041 | B2* | 2/2017 | Boveroux | B29C 70/302 |
| 10,029,511 | B2* | 7/2018 | Walthert | B60B 1/0261 |
| 10,173,363 | B2* | 1/2019 | Boveroux | B29C 70/06 |
| 10,875,572 | B2* | 12/2020 | Reddehase | B62D 7/20 |
| 11,352,093 | B2* | 6/2022 | Staples | B62K 21/26 |
| 2021/0180645 | A1* | 6/2021 | Ohta | B29C 70/86 |

FOREIGN PATENT DOCUMENTS

| | | | | |
|---|---|---|---|---|
| DE | 102015118890 | A1 * | 5/2017 | F16C 7/023 |
| DE | 102016200609 | A1 * | 7/2017 | |
| EP | 0839593 | A1 * | 5/1998 | |
| EP | 1 864 027 | A1 | 12/2007 | |
| EP | 2 643 600 | A1 | 10/2013 | |
| FR | 2 755 044 | A1 | 4/1998 | |
| FR | 3 035 605 | A1 | 11/2016 | |
| GB | 1233054 | A * | 5/1971 | |
| GB | 1603732 | A * | 11/1981 | B23P 15/00 |
| JP | 2001153126 | A * | 6/2001 | |
| WO | WO 2006/103372 | A1 | 10/2006 | |
| WO | WO-2008104396 | A1 * | 9/2008 | B21K 1/06 |
| WO | WO 2012/069724 | A1 | 5/2012 | |
| WO | WO-2020174692 | A1 * | 9/2020 | F16C 3/026 |

OTHER PUBLICATIONS

Machine translation of DE 102015118890 A1 obtained on Feb. 23, 2024.*
Machine translation of DE 102016200609 A1 obtained on Feb. 23, 2024.*
Machine translation of EP 0839593 A1 obtained on Feb. 23, 2024.*
International Search Report as issued in International Patent Application No. PCT/FR2021/051623, dated Jan. 5, 2022.

* cited by examiner

HOLLOW CONNECTING ROD

CROSS-REFERENCE TO RELATED APPLICATIONS

This application is the U.S. National Stage of PCT/FR2021/051623, filed Sep. 22, 2021, which in turn claims priority to French patent application number 2009642, filed Nov. 23, 2020. The content of these applications are incorporated herein by reference in their entireties.

TECHNICAL FIELD OF THE INVENTION

The technical field of the invention is that of dual ball-joint connecting rods and more particularly those used in aeronautical engines or any other product containing connecting rods and needing to control the mass.

TECHNOLOGICAL BACKGROUND OF THE INVENTION

Today, these connecting rods are made of metal or solid composites (of round or not round, constant or not constant cross-section).

These connecting rods are available and inexpensive, they can withstand fairly high temperatures (>300° C.), are generally metal (steel, stainless steel) and of simple geometry (round bar with a constant solid cross-section) but are relatively heavy, especially when the dimensions between the two interfaces become distant. Indeed, as indicated by Euler's formula, at iso-resistance (buckling/compression, tension), the mass of solid round connecting rods increases as the cube of the distance between the attachment points.

However, when the attachment points become increasingly distant, for example from 331 mm to 440 mm, one of the objectives was to find a concept of connecting rod that could be manufactured at a lower cost and that was lighter in order to limit mass of the engine or the product containing this connecting rod.

In order to respond to these problems, there are metal or composite tubular connecting rods as described in patents EP 2 643 600 and EP 1 864 027.

However, the weight of the connecting rod is still significant and it is not possible to reduce the walls without degrading performance of these connecting rods.

SUMMARY OF THE INVENTION

The invention provides a solution to the previously discussed problems, by reducing the amount of material, which makes it possible to lighten the connecting rod, while increasing its inertia, hence a buckling reinforcement, especially in the central zone.

The connecting rod according to the invention comprises a hollow body with a bushing at each end and a centre, a wall having thickness e, the wall defining an external perimeter $p_e$ and an internal perimeter $p_i$, a cross-sectional area s being included between the external and internal perimeters, it is characterised in that the external perimeter $p_e$ increases from the ends of the hollow body towards the centre of the connecting rod, the hollow body keeping a constant cross-sectional area s, the thickness e decreasing from the end towards the centre of the connecting rod.

The geometry of the new connecting rod grows hollow and adopts an increasing perimeter from the edges towards the centre. The wall thickness is also adjusted to equalise working cross-sections all along the hollow body, thus the minimum thickness is in the centre of the connecting rod. The cross-section remaining constant makes it possible to keep some rigidity of the connecting rod. Thus, a reduction in mass, an increase in buckling resistance and an increase in the frequency of the first vibration modes are achieved. This profile provides both significant gains in mass (approximately −40%) and twice the resistance. The gain in resistance is such that the mass gain can be further intensified either by reducing the wall thickness or by switching to a lighter and/or less stiff material.

According to a first alternative, the hollow body is rotationally cylindrical, which allows both symmetry and balance of the connecting rod.

According to a second alternative, the hollow body is oval or rectangular. This can thus reduce the overall size in a given direction, for example if the connecting rod passes through a gas or liquid flow.

It is also possible to deviate the "trajectory", or deform the line or axis of the connecting rod, to avoid a (hot) zone or an object more easily than in the solid version because the hollow profile has better inertia and stiffness for the same mass.

Advantageously, a reinforcement ring is disposed in the centre of the connecting rod on the inner side of the hollow body. This reduces or even removes the risk of local buckling, as the wall is thinner in the centre of the connecting rod, which would otherwise risk collapsing on itself, or being damaged when handled, as the central zone is the most "exposed".

Advantageously, a hole is provided as an extension of the hollow body at an interface with each bushing. The presence of these holes at the edges of the interfaces serves in particular to make the connecting rod "depowderable", that is, to allow the powder to be discharged from the central cavity at the end of additive manufacturing by laser beam melting (LBM) or laser powder bed fusion (LPBF) without weakening it. This also makes it possible to lighten the connecting rod.

Advantageously, the length of the connecting rod is greater than or equal to 440 mm. The profile is particularly adapted to long connecting rods.

The invention also relates to a method for manufacturing a connecting rod with at least one of the previous characteristics, being characterised in that the connecting rod is made by additive manufacturing. This manufacturing method allows a cost saving of about −20% compared to the conventional profile. Additive manufacturing can be done by laser powder bed fusion, or by DED (Direct Energy Deposition).

According to an alternative manufacturing method, the connecting rod is made in foundry.

According to another alternative manufacturing method, the connecting rod is made by machining. It is possible to combine foundry with machining.

Advantageously, the manufacturing method comprises the following steps of:
  making a first half-connecting rod,
  making a second half-connecting rod,
  assembling the two half-connecting rods.

Assembling the two half-connecting rods can be carried out by welding, brazing, screwing or any other assembling method.

BRIEF DESCRIPTION OF THE FIGURES

The figures are set forth by way of indicating and in no way limiting purposes of the invention.

DETAILED DESCRIPTION

The figures are set forth by way of indicating and in no way limiting purposes of the invention.

Unless otherwise specified, a same element appearing in different figures has a single reference.

Figure 1:
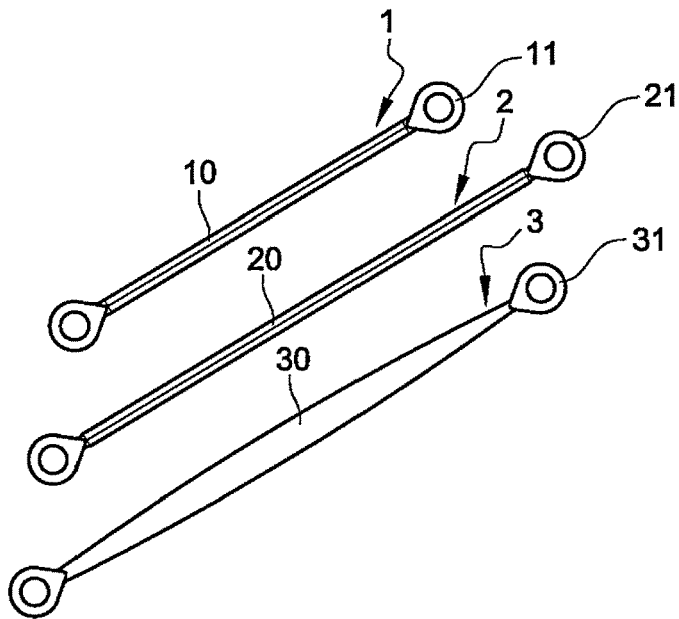
FIG. 1 is a perspective view of different sizes and shapes of connecting rods.

It can be seen in FIG. 1 that conventional connecting rods 1 and 2 of the state of the art are becoming increasingly longer, which leads to an increase in the diameter of the body 10, 20 which connects the two bushings 11, 21 disposed at one end 36 and therefore their weight. They are generally made of metal, steel or stainless steel. The connecting rod 3 according to the invention, unlike the connecting rods 1 and 2 of the state of the art, does not have a constant diameter. All these connecting rods 1, 2 and 3 have a longitudinal axis X.

Figure 2:
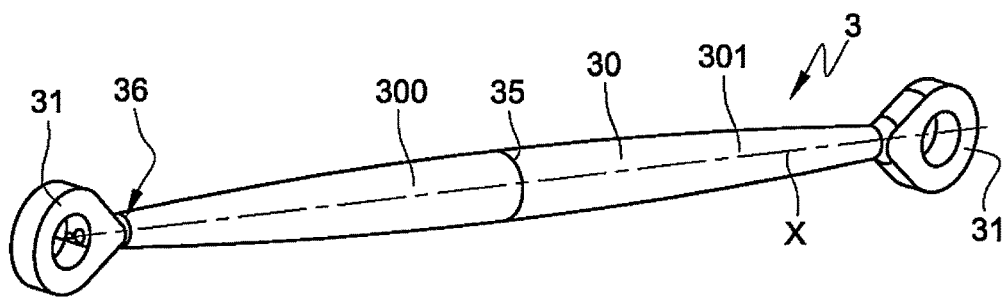
FIG. 2 is a perspective view of a connecting rod according to the invention.

The connecting rod 3 visible in more detail in FIG. 2 has a hollow body 30 in two parts constituting two half-connecting rods 300 and 301, but it could also be in one part without departing from the scope of the present invention. The body 30 ends in two bushings 31, each of which is to be connected to and serving as a hinge with a piece. An interface 310 connects each end 36 of the hollow body 30 to a bushing 31.

Figure 3:
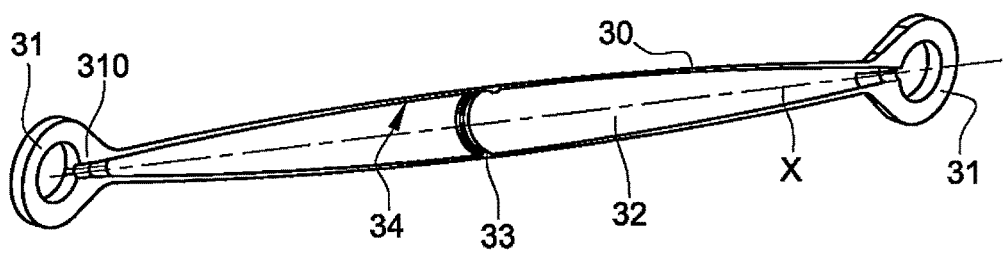
FIG. 3 is a cross-section view of the connecting rod of FIG. 2.
Figure 6:
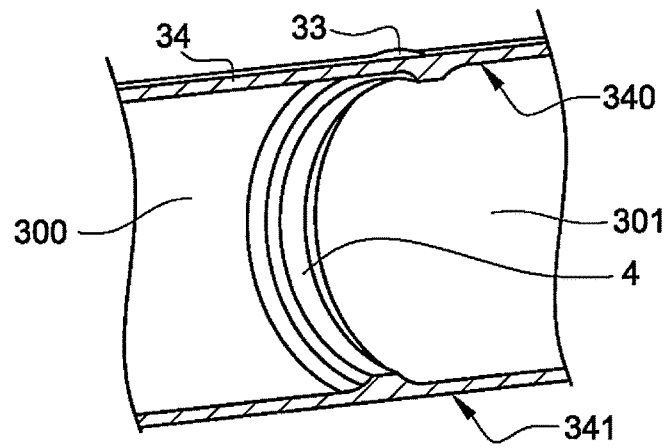
FIG. 6 shows detail of the centre of the connecting rod.
Figure 7:
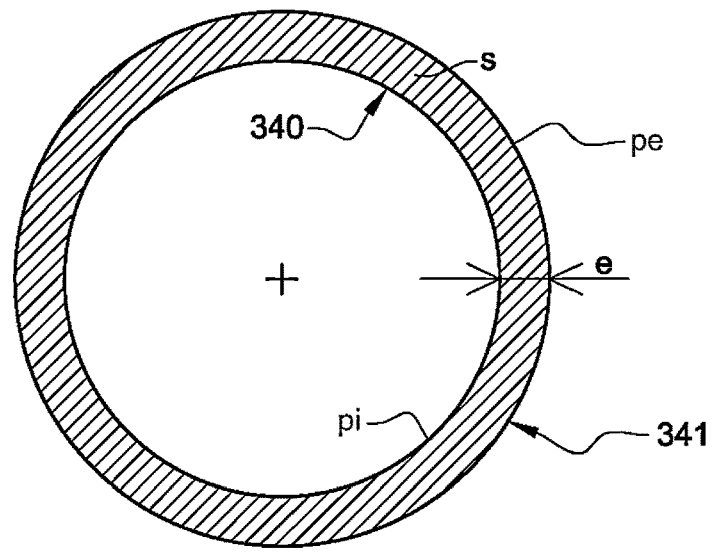
FIG. 7 is a cross-section view of the hollow body.

As can be seen in FIG. 3, the hollow body 30 defines an internal space 32. The two half-connecting rods 300 and 301 are connected to each other by a linkage 33 made by welding, brazing or any other linkage means. It is seen in FIG. 6 that a reinforcement ring 4 is placed in the centre 35 of the connecting rod 3, that is, here on the linkage 33 between the two half-connecting rods 300 and 301. This reinforcement ring 4 is disposed inside the hollow body 30 on the inner part 340 of the wall 34. It makes it possible to reduce or even remove the risk of local buckling of the wall 34, which is thinner in the centre 35.

Figure 4:
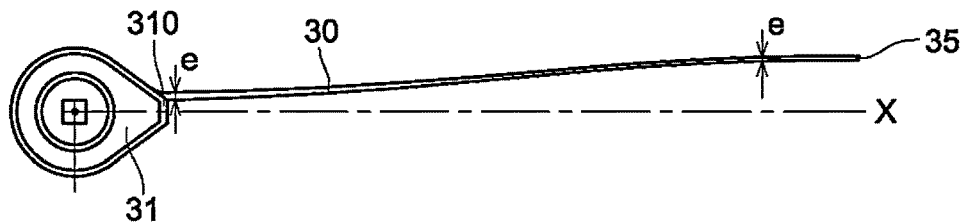
FIG. 4 is a cross-section view of a half-connecting rod according to the invention.
Figure 5:
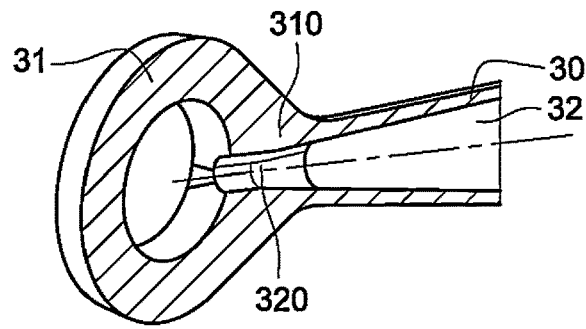
FIG. 5 shows the detail of the interface of the hollow body and a bushing according to one alternative of the invention.

The wall 34 of the hollow body 30 has a thickness e. As visible in FIG. 4, the thickness decreases from the interface 310 to the centre 35 of the connecting rod 3, while the distance between the axis X and the wall 34 increases. The surface of the cross-section s is here circular, it is the difference between the surface defined by the external wall 341 and the surface defined by the internal wall 340 for a given cross-section, that is, the surface between the external perimeter $p_e$ of the wall 34 and the internal perimeter $p_i$ of the wall 34. The surface area of the cross-section s remains constant all along the hollow body 30, thus the more the distance between the axis X and the wall 34 increases, the more the thickness e decreases. The cross-section of the wall 34 could also be oval or rectangular, or even change shape from the interface 310 to the centre 35 of the connecting rod 3, while still remaining closed. The axis X is rectilinear here, but it can be deformed to avoid a zone (a hot zone, for example) or an object.

The wall thickness is thus adjusted so as to equalise working cross-sections all along the hollow body 30, with the minimum thickness being at the centre of the connecting rod.

The interface 310 between the bushing 31 and the hollow body 30 here has a hole 320 disposed as an extension of the internal space 32. It has to allow the powder remaining in the hollow body 30 to be discharged during additive manufacturing.

The connecting rod 3 can indeed be made by additive manufacturing by laser powder bed fusion. It can also be made by direct energy deposition. These manufacturing methods make it possible to achieve the desired wall thicknesses. Manufacturing the connecting rod 3 is then performed vertically.

The connecting rod 3 can also be built in a single part or in two half-connecting rods assembled by welding, brazing or screwing. This is particularly the case if it is manufactured by foundry or machining.

Figure 8:
FIG. 8 illustrates results of finite element simulation of buckling of the connecting rod with a conventional profile.
Figure 9:
FIG. 9 illustrates results of finite element simulation of buckling of the connecting rod with a hollow profile according to the invention.

Finite element simulations have been carried out to evaluate buckling of the connecting rod 3 (FIG. 9) with respect to a connecting rod with a conventional profile (FIG. 8) having the same length. Three types of buckling were defined:

buckling A,
buckling B,
buckling C.

A load multiplier (MC in Tables 8 and 9) has been calculated for each type of buckling, wherein it corresponds to the factor by which the load applied to the connecting rod has to be multiplied to obtain the buckling considered.

For buckling A, it is found that the load applied to the connecting rod 3 is more than twice as high as that for the conventional connecting rod, 2.354 instead of 1.0985.

For buckling B, the difference between the two connecting rods is more than 50%, 6.7314 for 4.351.

For buckling C, the difference is also more than 50%: 7.0982 for the connecting rod 3 and 4.6821 for the conventional connecting rod.

It is thus noticed that far from decreasing the properties of the connecting rod, especially its inertia, the profile of the connecting rod according to the invention improves its properties while significantly decreasing its weight, by up to 40%. The gain in resistance is such that the mass gain can be further enhanced either by reducing the wall thickness or by switching to a lighter, less stiff material such as a TA6V type titanium alloy, for example.

The invention claimed is:

1. A connecting rod comprising a hollow body with a bushing at each of two ends and a centre, a wall having a thickness, the wall defining an external perimeter and an internal perimeter, a cross-sectional area being included between the external and internal perimeters, wherein the external perimeter increases from each of the two ends of the hollow body towards the centre of the connecting rod, the hollow body keeping constant the cross-sectional area all along the hollow body, the thickness decreasing from the end towards the centre of the connecting rod.

2. The connecting rod according to claim 1, wherein the hollow body is rotationally cylindrical.

3. The connecting rod according to claim 1, wherein the hollow body is oval or rectangular.

4. The connecting rod according to claim 1, comprising a reinforcement ring that is disposed in the centre of the connecting rod on an inner side of the hollow body.

5. The connecting rod according to claim 1, comprising a hole that is provided as an extension of the hollow body at an interface with each bushing.

6. The connecting rod according to claim 1, wherein a length of the connecting rod is greater than or equal to 440 mm.

7. A method for manufacturing a connecting rod according to claim 1, comprising making the connecting rod by additive manufacturing.

8. The method for manufacturing a connecting rod according to claim 7, comprising:
   making a first half-connecting rod,
   making a second half-connecting rod, and
   assembling the two half-connecting rods.

9. A method for manufacturing a connecting rod according to claim 1, comprising making the connecting rod by casting.

10. A method for manufacturing a connecting rod according to claim 1, comprising making the connecting rod by machining.

* * * * *